Oct. 17, 1950     H. F. RYAN     2,526,507
RADIUS GRINDER FOR TOOLS
Filed Jan. 17, 1950     3 Sheets-Sheet 1
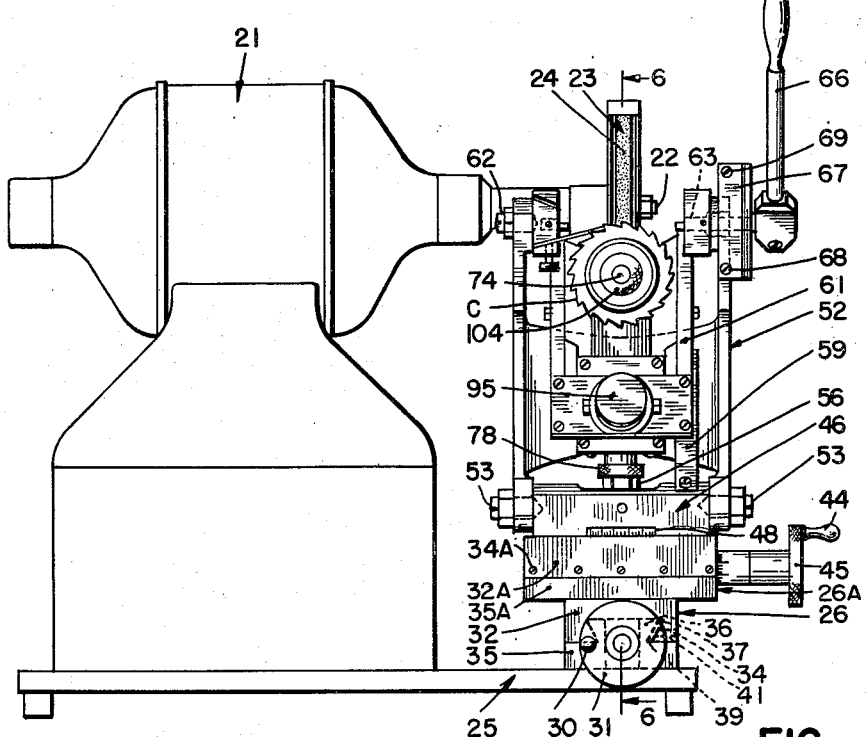
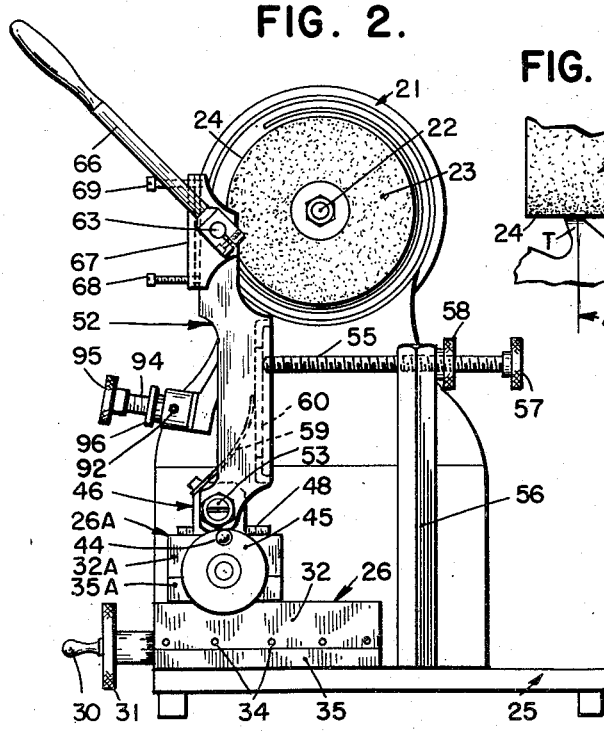
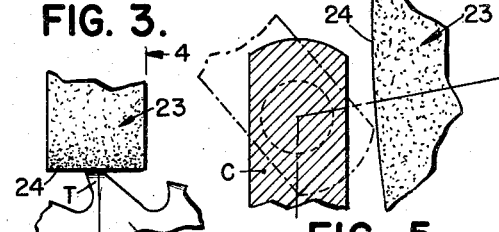
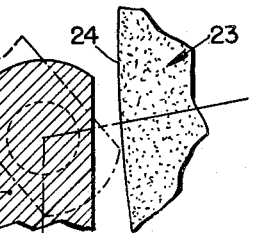
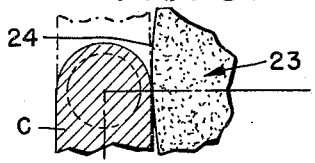
INVENTOR
HOWARD F. RYAN
BY
ATTORNEY Oct. 17, 1950      H. F. RYAN      2,526,507
RADIUS GRINDER FOR TOOLS
Filed Jan. 17, 1950      3 Sheets-Sheet 2
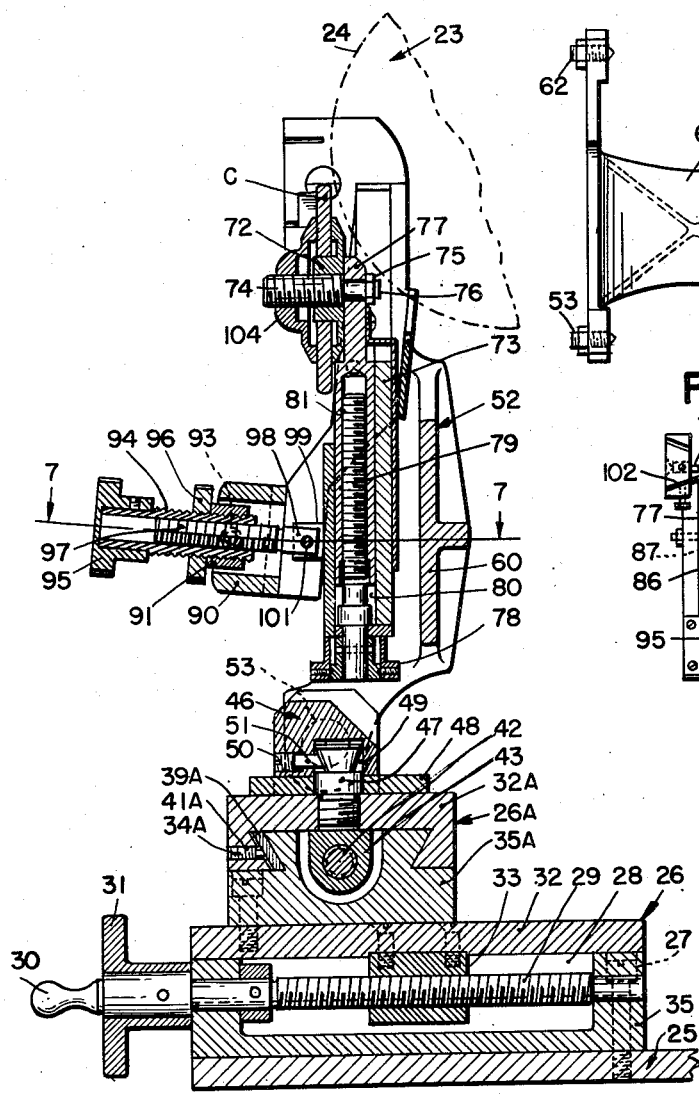
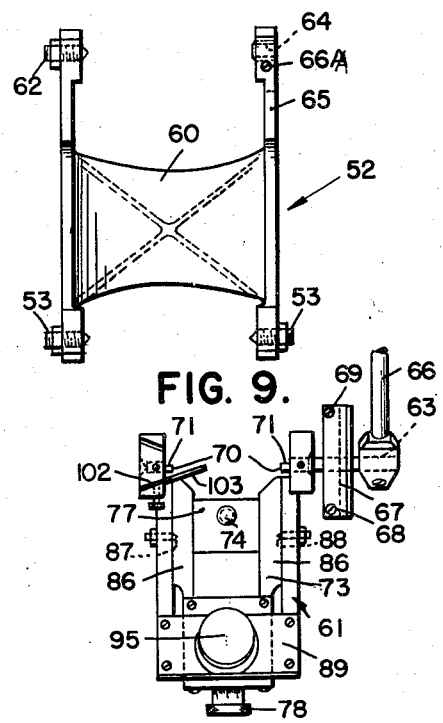
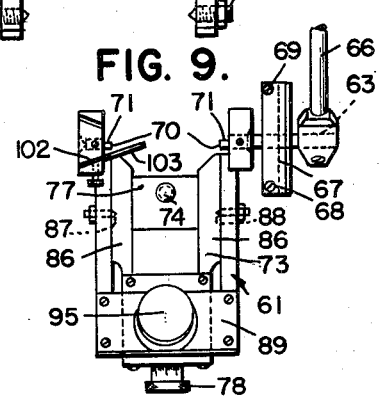
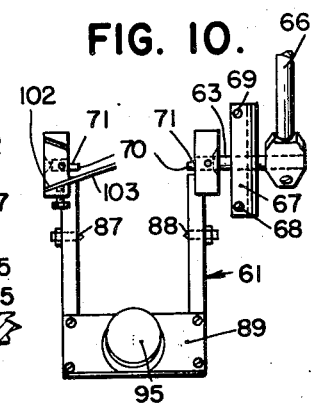
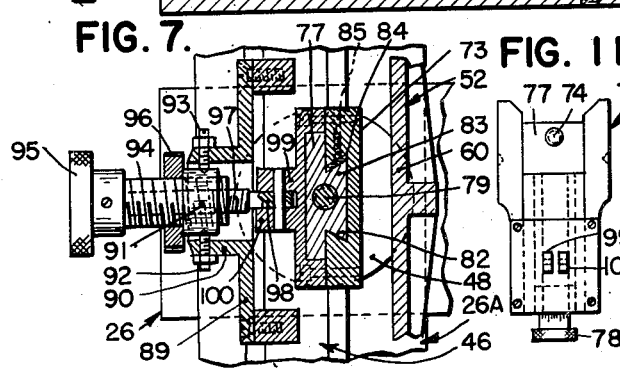
INVENTOR
HOWARD F. RYAN
BY
ATTORNEY Oct. 17, 1950         H. F. RYAN         2,526,507
RADIUS GRINDER FOR TOOLS Filed Jan. 17, 1950         3 Sheets-Sheet 3

INVENTOR
HOWARD F. RYAN
BY

ATTORNEY

Patented Oct. 17, 1950

2,526,507

UNITED STATES PATENT OFFICE 2,526,507

RADIUS GRINDER FOR TOOLS

Howard F. Ryan, Long Beach, Calif.

Application January 17, 1950, Serial No. 138,961

4 Claims. (Cl. 51—96)

This invention relates to a radius grinder for sharpening the teeth of rotary cutters and the like.

One object of the invention is to provide a compact machine for sharpening rounded end cutter teeth. Another object is to provide a precision machine for sharpening rounded teeth on rotary cutters which machine is readily adjustable for different diameters and amount of relief and for different thicknesses of cutters.

These and other objects are attained by my invention which will be understood from the following description, reference being made to the accompanying drawings in which:

Figure 1 is a side elevational view of a preferred form of my radius grinder;

Figure 2 is an end elevational view of the same;

Figure 3 is a fragmentary plan view of a typical cutter tooth showing its position relative to the grinding wheel;

Figure 4 is a diagrammatic view taken on the line 4—4 of Figure 3 showing the manner of rounding the outer cutting edge of a tooth, the cutter being shown in full lines at the start of the operation and the broken lines showing the finish of the operation;

Figure 5 is a diagrammatic view similar to Figure 4 showing a different position of a tooth and the grinder wheel giving a 180° rounded face;

Figure 6 is a cross-sectional view taken on the line 6—6 of Figure 1;

Figure 7 is a cross-sectional view taken on the line 7—7 of Figure 6;

Figure 8 is a front elevational view of the main frame;

Figure 9 is a front elevational view of the cutter-holding cradle mounted in the swing frame;

Figure 10 is a front elevational view of the swing frame, the cutter-holding cradle having been removed;

Figure 11 is a plan view of the cutter-holding cradle;

Figure 12:
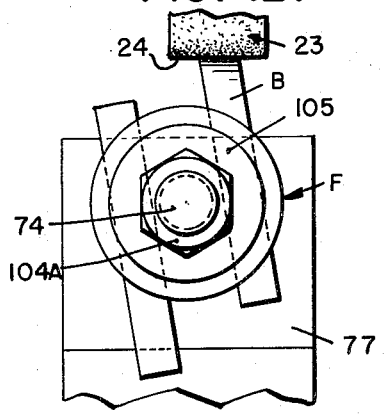
Figure 12 is a plan view showing means for mounting a single cutter bar in a fixture on the mandrel for grinding a rounded cutting end thereof.

In general, my machine consists of a motor driven grinding wheel mounted to operate in a vertical plane on a horizontal axis, the peripheral face of the wheel being used for abrading, and a cutter-holding fixture mounted on a common base in adjustable relation to the grinding wheel, a U-shaped main frame having adjustable fastening means to hold it in operative relation to the grinding wheel, a swing frame pivotally mounted in the open end of the main frame, a mandrel-carrying cradle pivotally attached to the swing frame, the mandrel being adjustable angularly with respect to the swing frame as well as longitudinally in relation to the cradle and arranged to hold the cutter in selected relation to the grinding face of the grinding wheel, together with means for turning the main frame on a central pivot so that the teeth of the cutter are formed by the grinding wheel with a cylindrical or conical cross-section.

The motor 21 having an elongated horizontal shaft 22 on which is mounted in the usual manner a grinding wheel 23 having a peripheral face 24 preferably not much wider than the peripheral length of a single tooth of the cutter to be sharpened, is mounted on a base plate 25. Mounting means for the tool holding and swinging device consists of a forward and backward traverse mounting block 26, which is attached to the base plate 25 by the bolts 27, the block having a longitudinal groove 28 in which is mounted a screw 29 actuated by a knob 30 on the hand wheel 31 attached at one end of the block 26. The block 26 is provided with a movable top plate 32 to which is attached, on the underside, a threaded follower 33 actuated by the screw 29. The movable top plate 32 is retained by the screws 34 and wear plate 39 to the lower dovetail slide block 35 having the dovetail slide 36 which is adapted to slide in the corresponding dovetail groove 37 of the top plate 32, the adjustable wear plate 39 being provided on one side of the groove 37, being adjustable for wear on the surfaces by the set screws 34 in the holes 41 in the block 32. A cross-feed screw 42 and follower 43 are provided to give relative sliding movement between the upper portion 32A of a slide unit 26A and upper block 32 of the slide unit 26, the screw 42 being actuated by the knob 44 and handwheel 45 on the protruding end of the cross-feed screw 42. The dovetail slide unit 26A is similar to the unit 26 and similar parts are marked with a suffix "A." The main frame base block 46 is arranged for pivotal connection to the upper dove-tail slide block 32A by the threaded stud 47 which extends through the index disk 48 attached to the base block 46, and into a circular recess 49 in the main frame base block 46. The stud 47 is provided with a tapered recess, and is held in the recess 49 by the wedge set screw 50 and the wedge pin 51, which permits the turning in a horizontal plane on the main frame base block 46 relative to the upper dovetail slide block 32A. The main frame 52 is mounted at the ends of the base block 46 by the pivot screws 53, the inclination from the vertical of the main frame 52 being adjustably fixed by the horizontal abutting screw 55, which is threadedly mounted in the post 56 on the base plate 25, an end adjusting knob 57 and a lock nut 58 being provided. A flat spring 59 attached at one end to the base block 46, and pressing at its other end against the ribbed back plate 60 of the frame 52 tends to hold the frame against the end of the abutting screw 55.

Figure 16:
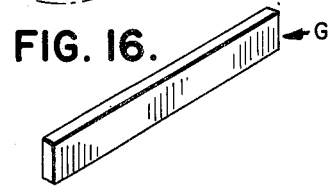
Figure 16 is a perspective view showing a template or gauge used for positioning the tool.

The U-shaped swing frame 61 is pivotally mounted at the upper ends of the main frame 52, on the inside (adjacent the motor) by the pivot screw 62, and at the opposite side on the turning shaft 63 which is fixed in the hole 64 in the outside leg 65 of the main frame 52 by the set screw 66A. The turning shaft 63 is extended outwardly to receive the turning handle 66 and the stop block 67, whose end stop screws 68 and 69 are adapted to limit the turning motion of the shaft 63 by abutting the edges of the outside leg 65 of the main frame 62. The vertical position of the axis on which the swinging frame 61 turns is indicated by inwardly extending pins 70 having axial lands 71 in a plane at right angles to the axis of the mandrel 72. Removable templates or gauges G (Figure 16) may be placed on these lands in the operation of adjusting the mandrel for grinding a particular cutter, to indicate the axis of turning and therefore the axis of the cylindrical or conical surface to be ground on the tooth or tool.

The mandrel 72 which is adapted to receive the center opening of a toothed cutter or the fixture F for bar tools, is threadedly attached on the threaded pin 74 which is rigidly attached to the movable plate 77 of the cradle 73 by the nut 75 on the extended threaded end 76. The cutter C is held on the mandrel 72 by the recessed finger nut 104. The movable plate 77 is longitudinally positioned in the cradle 73 by the knurled indexed knob 78 which is attached to one end of a traverse screw 79 mounted in a recess 80 in the cradle 73, the other end of the traverse screw engaging a threaded hole 81 in the movable plate 77, the movement of the plate being guided by the dovetail groove 82 in the cradle 73 complementary to the dovetail follower 83 extending from the movable plate 77. Any wear in this sliding arrangement is compensated by the wear plate 84 arranged along one side of the groove 82, with adjusting set screws 85 arranged to be accessible from the edge of the cradle. The cradle 73 is adapted to be pivotally mounted on its edge members 86 by the pivot screws 87 and 88 extending from the swing frame 61 at intermediate positions along the legs thereof, the angular position of the cradle 73 relative to the swing frame 61 being regulated and adjusted by telescoping pivoted screw means as described below, this adjustment providing quick and accurate means for changing the position of the mandrel 72 to accommodate cutters or tools of different thicknesses.

The swing frame 61 is provided at its lower or non-pivoted end with a bridge plate 89 which is laterally displaced and overlays the non-pivoted end portion of the cradle 73. The cradle 73 and the swing frame 61 are adjustably angularly positioned by coupling means consisting of a telescoping adjusting screw set which is doubly pivoted so that the positioning of the mandrel 72 relative to its distance from the axis of swing is not appreciably disturbed by the adjustment of the angular relation between the cradle and the swinging frame. A collar 90 is mounted on the bridge plate 89, to the inside of which is pivoted, parallel to the axis of swing, a threaded sleeve 91, the pivot screws 92 and 93 extending through the collar 90 to engage conical holes in the outer periphery of the sleeve 91, approximately midway between the ends. The hollow outer screw 94, provided with a thumb knob 95 is threaded on the outside with threads to fit the threads on the inside of the sleeve 91. A lock nut 96 is provided on the screw 94. The inner screw 97 is threaded to fit the inside threads of the hollow screw 94, to form a double-acting telescoping screw set. The free end 98 of the inner screw 97 is pivotally mounted in the bearing lugs 99 and 100 which are provided on the fixed portion of the cradle 73, disposed beneath the bridge plate 89, the axis of the pivoting pin 101 being parallel to the axis of the pivot mounting of the sleeve 91 in the collar 90.

The use of my radius grinder for sharpening teeth of rotary cutters will be readily understood from the above description of its structural arrangement. The cutter C whose teeth T are to be sharpened to a radius, is mounted on the mandrel 72 and held in place by the recessed mandrel nut 104. The median plane of the cutter is then aligned with the axis of the indicating pins 70 by adjusting the angular relation between the cradle 73 and the swing frame 61 by means of the knob 95 on the screw 94; the axis of the mandrel being adjusted toward or away from the axis of swing by means of the index knob 78. The radius of the cut is determined by the spacing of the main frame 52 from the cutting surface of the wheel by means of the screw 55, as indicated in Figures 4 and 5. The curved surface of each tooth may be cylindrical and tangent to the periphery of the cutter, or it may be conical, thereby giving a relief area back of the cutting edge, this being determined by the angular position of the main frame as indicated by the indexing means 48.

Figure 15:
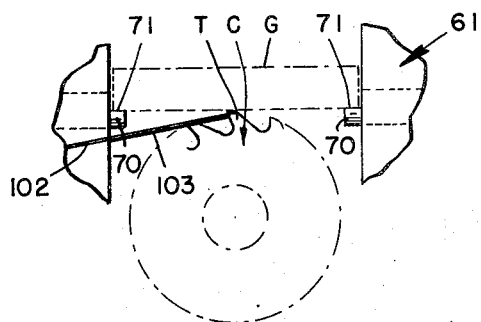
Figure 15 is a fragmentary front view showing the indexing means and gauging means for use in sharpening the teeth of a rotary cutter.

A flat indexing spring 103 may be arranged in the slot 102 in the pivoted end of the swing frame 61 as indicated in Figure 15, to position each tooth for the grinding operation.

Figure 13:
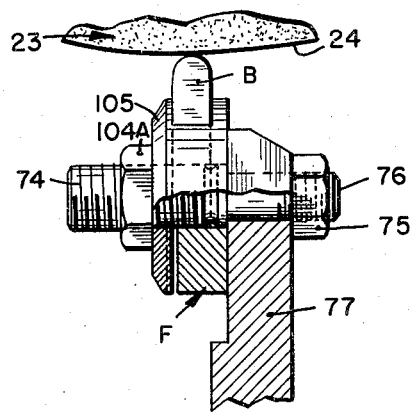
Figure 13 is a side elevational view partly in section of the set-up of Figure 12.
Figure 14:
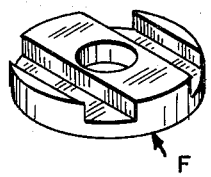
Figure 14 is a perspective view of the bar-holding fixture for the set-up of Figures 12 and 13.

My radius grinder may also be used for grinding individual bar cutters as indicated in Figures 12, 13 and 14. A fixture F is provided to fit on the stud 74 with a clamping nut 104A and washer 105 arranged to hold the tool steel bars B in the groove of the fixture. The end of the bar B may then be rounded in the manner described for rounding teeth of rotary cutters.

The advantages of my grinding machine will be apparent. The several adjustment means permit a large variation in the contours of the rounded cutter tooth which may be formed or sharpened on the machine. Having once adjusted the machine, the teeth of each cutter may be formed uniformly and with great precision. The machine is relatively inexpensive, is simple to operate and is quickly adjusted for different sized cutters.

I claim:

1. In a radius grinder having a base upon which is fixedly mounted a peripheral grinding wheel with motor means therefor, a fixture for holding a cutter against said grinding wheel attached on said grinder base comprising a main frame having upright arms adapted to be inclined from the vertical; adjusting means for positioning said main frame relative to the grinding wheel surface; a swing frame pivotally mounted on the upper ends of said upright arms of said main frame; a cradle pivotally mounted in said swing frame at points intermediate the ends of said cradle and said arms; a mandrel mounted on said cradle, said mandrel being adapted for holding said cutters during grinding; coupling means for adjustably positioning said cradle on its pivots relative to the said swing frame; and handle means for turning said swing frame through a portion of a revolution while contacting said cutter against said grinding wheel, said cutter being mounted on said mandrel.

2. In a radius grinder having a base upon which is fixedly mounted a peripheral grinding wheel with motor means therefor, a fixture for holding a cutter against said grinding wheel attached on said grinder base comprising a main frame having upright arms adapted to be inclined from the vertical; adjusting means for positioning said main frame relative to the grinding wheel surface; a swing frame pivotally mounted on the upper ends of said upright arms of said main frame; a cradle pivotally mounted on said swing frame at points intermediate the ends of said cradle and said arms; a mandrel mounted on said cradle, said mandrel being adapted for holding said cutter during grinding; slide means for moving said mandrel toward and away from the pivot axis of turning of said swing frame; coupling means for adjustably positioning said cradle on its pivots relative to said swing frame; and handle means for turning said swing frame through a portion of a revolution while contacting a cutter against said grinding wheel, said cutter being mounted on said mandrel.

3. In a radius grinder for cutter teeth and the like having a base upon which is fixedly mounted a peripheral grinding wheel with motor means therefor, a fixture for holding a toothed cutter against said grinding wheel, said fixture being pivotally on cross slide means attached on said grinder base, said fixture comprising a main frame having upright arms adapted to be inclined from the vertical; adjusting means for positioning said main frame relative to the grinding wheel surface; a swing frame pivotally mounted on the upper ends of said upright arms of said main frame; a cradle pivotally mounted in said swing frame at points intermediate the ends of said cradle and said arms; a mandrel vertically mounted on said cradle, said mandrel being adapted for holding said cutter during grinding; slide means for moving said mandrel toward and away from the pivot axis of turning of said swing frame; coupling means for adjustably positioning said cradle on its pivots relative to the said swing frame; and handle means for turning said swing frame through a portion of a revolution while contacting a selected tooth of said cutter against said grinding wheel, said cutter being mounted on said mandrel.

4. The fixture as described in claim 2 in which the coupling means between said cradle and said swing frame comprises telescoping screws which are pivotally connected respectively to said cradle and said swing frame, the axis of said pivotal connections being parallel to the axis of swinging of said swing frame.

HOWARD F. RYAN.

No references cited.